(12) United States Patent
Morison et al.

(10) Patent No.: US 7,189,959 B1
(45) Date of Patent: Mar. 13, 2007

(54) FIBER OPTIC IMPACT DETECTION SYSTEM

(75) Inventors: W. Donald Morison, Mississauga (CA); Roderick C. Tennyson, Toronto (CA); Thierry Cherpillod, Maple (CA)

(73) Assignee: Fiber Optic Systems Technology, West Chester, PA (US)

( * ) Notice: Subject to any disclaimer, the term of this patent is extended or adjusted under 35 U.S.C. 154(b) by 181 days.

(21) Appl. No.: 11/082,849

(22) Filed: Mar. 18, 2005

Related U.S. Application Data

(60) Provisional application No. 60/553,959, filed on Mar. 18, 2004.

(51) Int. Cl.
*H01J 5/16* (2006.01)

(52) U.S. Cl. .......................... 250/227.14; 250/227.15; 340/550

(58) Field of Classification Search ........................ 250/227.14–227.16; 340/550, 555, 541; 385/13
See application file for complete search history.

(56) References Cited

U.S. PATENT DOCUMENTS

| | | | | |
|---|---|---|---|---|
| 4,586,030 A | * | 4/1986 | Klostermann | ............... 340/550 |
| 4,603,252 A | | 7/1986 | Malek et al. | |
| 4,772,092 A | * | 9/1988 | Hofer et al. | ................. 385/13 |
| 4,781,056 A | * | 11/1988 | Noel et al. | .................... 73/800 |
| 4,836,030 A | | 6/1989 | Martin | |
| 4,936,649 A | | 6/1990 | Lymert et al. | |
| 5,015,842 A | * | 5/1991 | Fradenburgh et al. | . 250/227.15 |
| 5,072,110 A | | 12/1991 | Lu et al. | |
| 5,245,180 A | | 9/1993 | Sirkis | |
| 6,559,437 B1 | | 5/2003 | Pope et al. | |

OTHER PUBLICATIONS

"Hypervelocity Impact Damage to Polymer Matrix Composite Structures In Space", C. Lamontagne, Toronto-Canada, Graduate Dept. of Aerospace Science and Engineering, 2003, pp. 1-146.

\* cited by examiner

*Primary Examiner*—Thanh X. Luu
*Assistant Examiner*—Tony Ko
(74) *Attorney, Agent, or Firm*—Blank Rome LLP

(57) ABSTRACT

Closely spaced conventional optical fibers are arranged in a grid placed between a first surface and a second surface. A penetrating impact onto the first surface results in a hole of a size proportional to the diameter and velocity of the impacting object. The size and shape of the debris plume that travels between the first and second surfaces is also proportional to the diameter and velocity of the impacting object. If the debris plume is sufficiently energetic, a number of the fibers in the grid are broken. The size and shape of the area defined by the broken fibers can be determined simply by determining which fibers are no longer transmitting light. Analytical methods are then used to relate the extent of the damaged area to the location of an MOD impact, the direction from which the impact occurred, and the size of the impacting object.

19 Claims, 11 Drawing Sheets

FIBER OPTIC IMPACT DETECTION SYSTEM

REFERENCE TO RELATED APPLICATION

The present application claims the benefit of U.S. Provisional Patent Application No. 60/553,959, filed Mar. 18, 2004, whose disclosure is hereby incorporated by reference in its entirety into the present disclosure.

FIELD OF THE INVENTION

The invention is directed to an improved fiber optic based sensor system to detect and quantify the area of damage caused by an impacting object and more particularly the area of damage caused by the impact of a hypervelocity object. The invention is further directed to a method for using such a sensor system.

DESCRIPTION OF RELATED ART

The use of bumper shields and energy absorbing materials to minimize the damage caused by impacts is well known, particularly for aircraft, automotive or spacecraft applications. Such systems are used to enhance safety and to reduce the weight requirements for the protection of manned structures.

Most space vehicles, including the current space station, are comprised of large, interconnected habitable modules that incorporate the passive protection scheme described above. The probability of impacts by high energy micrometeoroids or orbital debris (MOD) that might breach the protection system is sufficiently high that loss of a module, the vehicle, or human life is possible. Knowledge of the location of MOD damage and the severity of the damage is essential for continued operational reliability and safety. Unfortunately, there is no adequate system currently available that will permit the detection of the location of an MOD impact, the direction from which the impact occurred, the size of the impacting object and the extent of the damage caused by the impact.

One method of damage detection involves the use of closely spaced optical fibers in an X-Y grid pattern as taught in several U.S. patents, including U.S. Pat. Nos. 4,603,252, 4,772,092, 4,781,056, and 4,836,030. In U.S. Pat. No. 4,936,649, Lymer et al. teach such a system for detecting damage to composite materials. In that system, a plurality of specially treated optical fibers is embedded into the composite material during manufacturing. The special treatment consists of a chemical etching of the fibers to weaken them at certain locations so that they will break at predetermined strain levels. The optical fibers are illuminated by a light source at one end and when an object strikes the surface with sufficient energy to break one or more fibers, the loss of light throughput is measured at a photodetector at the other end of the fiber. That system is unsuitable for many applications because the failure strength of the fibers must be tailored for each case to ensure that the fiber will break at some acceptable damage threshold for the structure. In addition, such a system is not amenable to non-composite structures or in a retrofit application as the fibers must be embedded in the composite material.

In U.S. Pat. No. 5,015,842, Fradenburgh et al. teach a system similar to that of Lymer et al.; however, in that system, untreated optical fibers are looped repeatedly in two separate X-direction and Y-direction grids before being embedded in or bonded onto a composite structure. The use of untreated fibers is an improvement over Lymer et al. However, the attempt to increase efficiency and reduce complexity by covering a larger area with a single fiber laid in the looping pattern is defeated once a fiber is broken by an impact, because a large portion of the surface is then left unmonitored.

In U.S. Pat. No. 5,072,110, Lu et al. teach a laser diode driven system that employs two-mode elliptical core optical fiber as an impact and damage sensor. A single sensor system is described in which the need for closely spaced fibers is mitigated by the ability of the sensor to detect the effect of acoustic waves at distances of up to one foot. The coupling of a multiplicity of fibers into the laser diode is required to accommodate large structures and intensity loss may make that impractical. Furthermore, without a closely spaced grid of fibers, localizing and quantifying the damaged area may not be possible with that system.

In U.S. Pat. No. 5,245,180, Sirkis teaches the use of a specially coated optical fiber as a sensor for damage detection. By coating the fiber with a linear work hardening elastic-plastic material before embedding, the sensing system remembers large strains to which it is exposed. While that system has the potential to track the changes in a material following impact, configuring the multitude of sensors required for a large structure would be bulky and costly as a light splitter and optical phase angle detector are required for each sensor.

Finally, in U.S. Pat. No. 6,559,437, Pope et al. teach a fiber optic damage system that employs an optical time domain reflectometer to locate faults within long lengths of optical fiber; however, that system is directed to fault detection for electrical conductors.

SUMMARY OF THE INVENTION

There is thus a need in the art for a fiber optic based sensor system which overcomes the previously described limitations of all currently available damage detection systems.

Accordingly, one object of the invention is to provide an improved damage detection sensor with an associated system.

A further object of the invention is to provide a light weight, cost effective damage sensor and system that employs standard optical fibers and is suitable for weight critical applications.

A further object of the invention is to provide a sensor that is easily adapted to existing structures.

A further object is to provide a sensor that is mounted on the surface of a structure and can also be embedded.

A further object of the invention is to provide a sensor that is used to determine the size of an impacting object and its direction.

A further object of the invention is to provide a sensor that is suitable for monitoring impact damage on very large structures.

A further object of the invention is to provide a sensor where post damage measurements are possible.

A further object of the invention is to provide a sensor and associated system that uses simple mathematical, optical and electronic means to accurately locate damaged areas.

To achieve the above and other objects, the invention employs closely spaced conventional optical fibers in an orthogonal grid supported by a flexible carrier material. The fibers are illuminated at one end by any elementary method. The grid is placed between a first surface and a second surface at some stand off distance from the first surface. A penetrating impact onto the first surface, which can be a metallic or composite material, results in a hole of a size that is proportional to the diameter and velocity of the impacting object. The size and shape of the debris plume that travels between the first and second surfaces, when the object penetrates the surface, is also proportional to the diameter and velocity of the impacting object. If the debris plume is sufficiently energetic, a number of the fibers in the grid are broken. The size and shape of the area defined by the broken fibers can be determined simply by determining which fibers are no longer transmitting light. Analytical methods are then used to relate the extent of the damaged area to the location of an MOD impact, the direction from which the impact occurred, the size of the impacting object.

BRIEF DESCRIPTION OF THE DRAWINGS

A preferred embodiment will be set forth in detail with reference to the drawings, in which.

DETAILED DESCRIPTION OF THE PREFERRED EMBODIMENT

Figure 1:
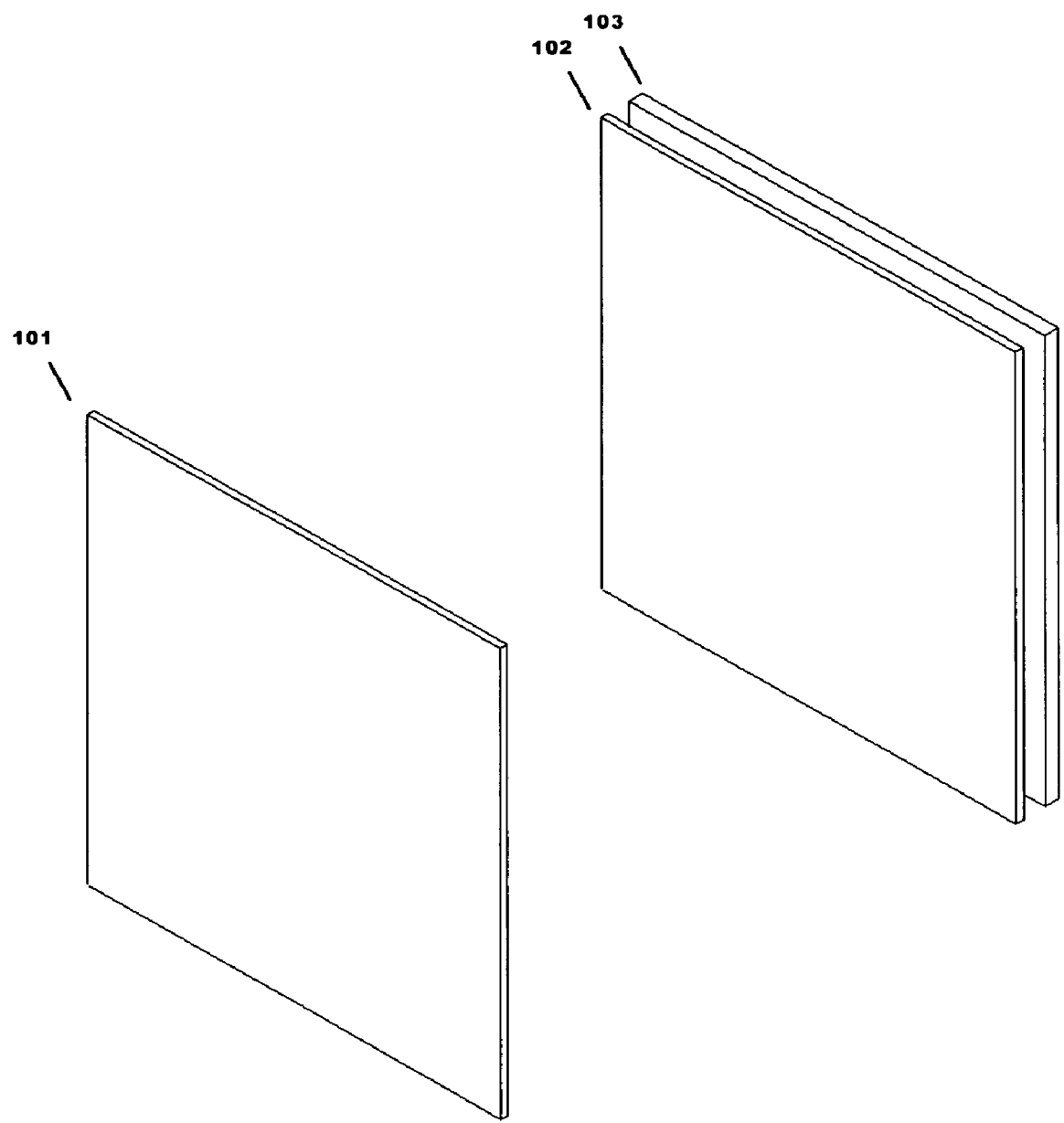
FIG. 1 shows a section of a structure with an energy absorbing layer and a bumper shield.

A preferred embodiment and its use will be set forth in detail with reference to the drawings, in which like reference numerals refer to like elements throughout.

Referring to FIG. 1, a section of the typical structure used in spacecraft and other vehicle construction is shown. The structure is comprised of a first surface that acts as a bumper shield 101, an energy absorbing layer 102 made of multiple plies of a material such as those sold under the trade names Nextel® or Kevlar®, and a second surface 103 that acts as the structural and pressure vessel wall.

Figure 2:
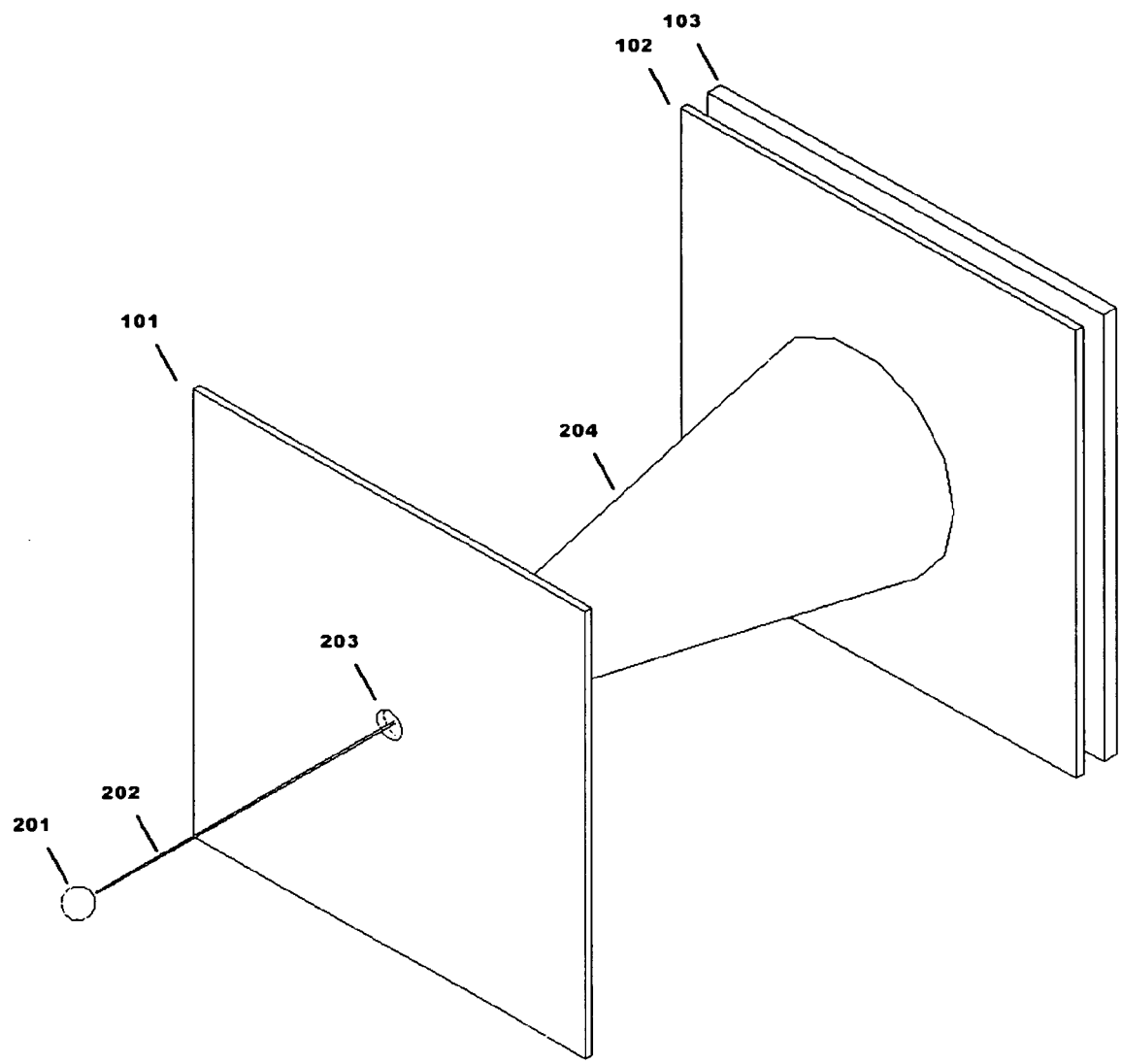
FIG. 2 shows a schematic of a hypervelocity impact on a bumper shield including the resulting debris plume.

Referring to FIG. 2, when a high energy object or MOD particle 201 travels along a trajectory 202 and strikes the bumper shield 101, it creates an entry hole 203 with a diameter that is proportional to the diameter of the MOD particle 201. The primary cause for concern is not the entry hole 203, but the damage to the second surface 103 that is caused by the debris plume 204 as it strikes the energy absorbing layer 102 and penetrates to the second surface 103. The debris plume 204 is comprised of the solid and gaseous remnants of both the MOD particle 201 and the material from the entry hole 203. The plume 204 can strike the energy absorbing layer 102 at velocities not substantially different from that of the incoming MOD particle 201.

Figure 3:
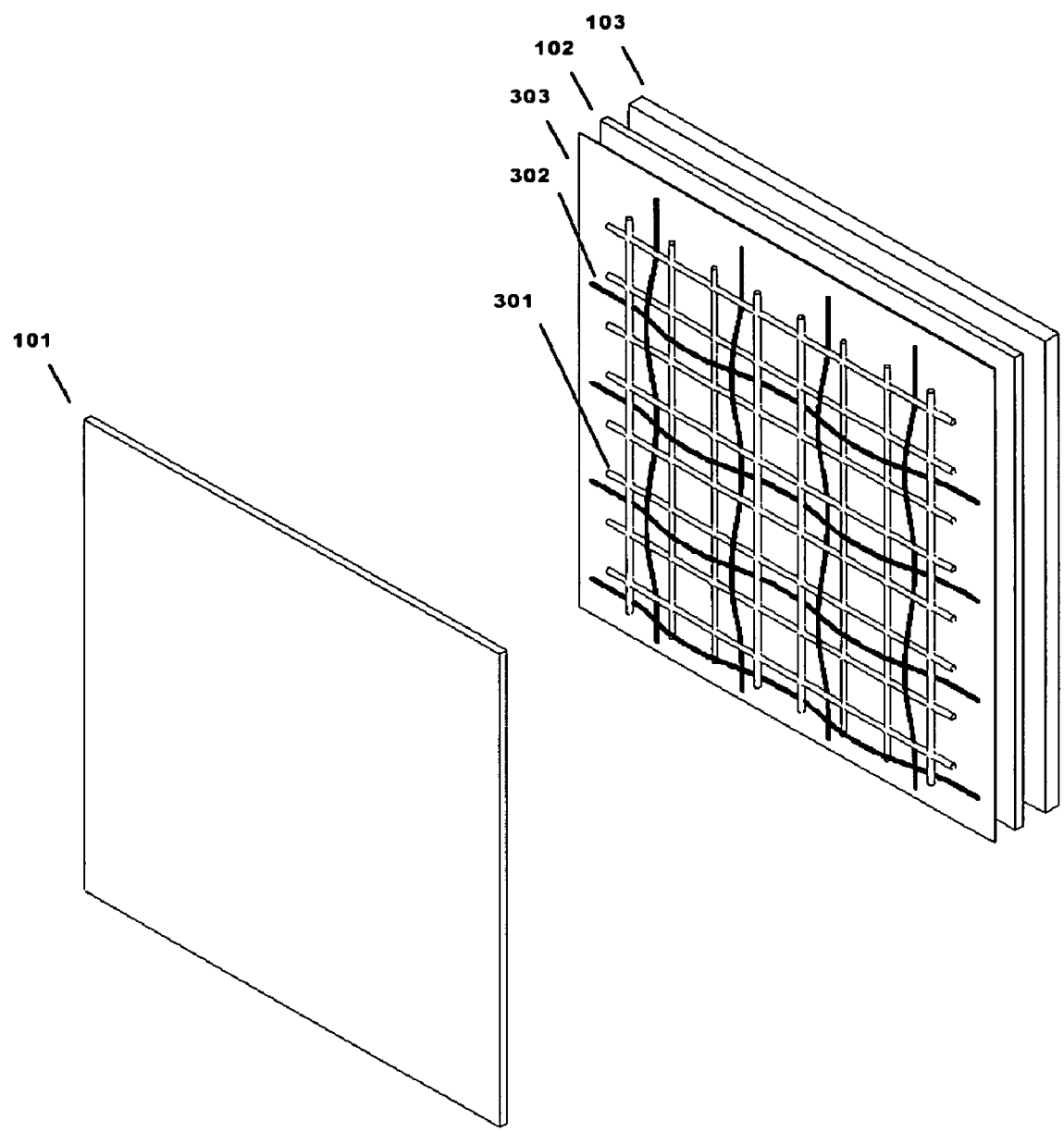
FIG. 3 shows a section of one embodiment of the fiber optic sensor and carrier material.

Referring to FIG. 3, an embodiment of a section of the fiber optic impact damage sensor is shown. In the present embodiment, a mesh structure 301 that is made of a strong, lightweight, open weave or fabric, such as fibreglass or the materials sold under the trade names Kevlar® and Nextel®, is used as a carrier for the optical fibers 302. The sensor utilizes conventional telecommunication optical fibers 302 manufactured by companies such as Corning and 3M™. The fibers 302 are woven through the mesh 301 in an orthogonal grid with a spacing that is suitable for detection of the impact of the smallest critical MOD particle 201. The mesh 302 and the optical fiber 302 grid are affixed to a tough, lightweight carrier 303 that is made from Mylar®, or another suitable material, using adhesives or mechanical fasteners. The assembly of the mesh 302, the optical fibers 302, and carrier 303 are then affixed to the energy absorbing layer 102 or the second surface 103 as the geometry of the vehicle or structure permits.

Figure 4:
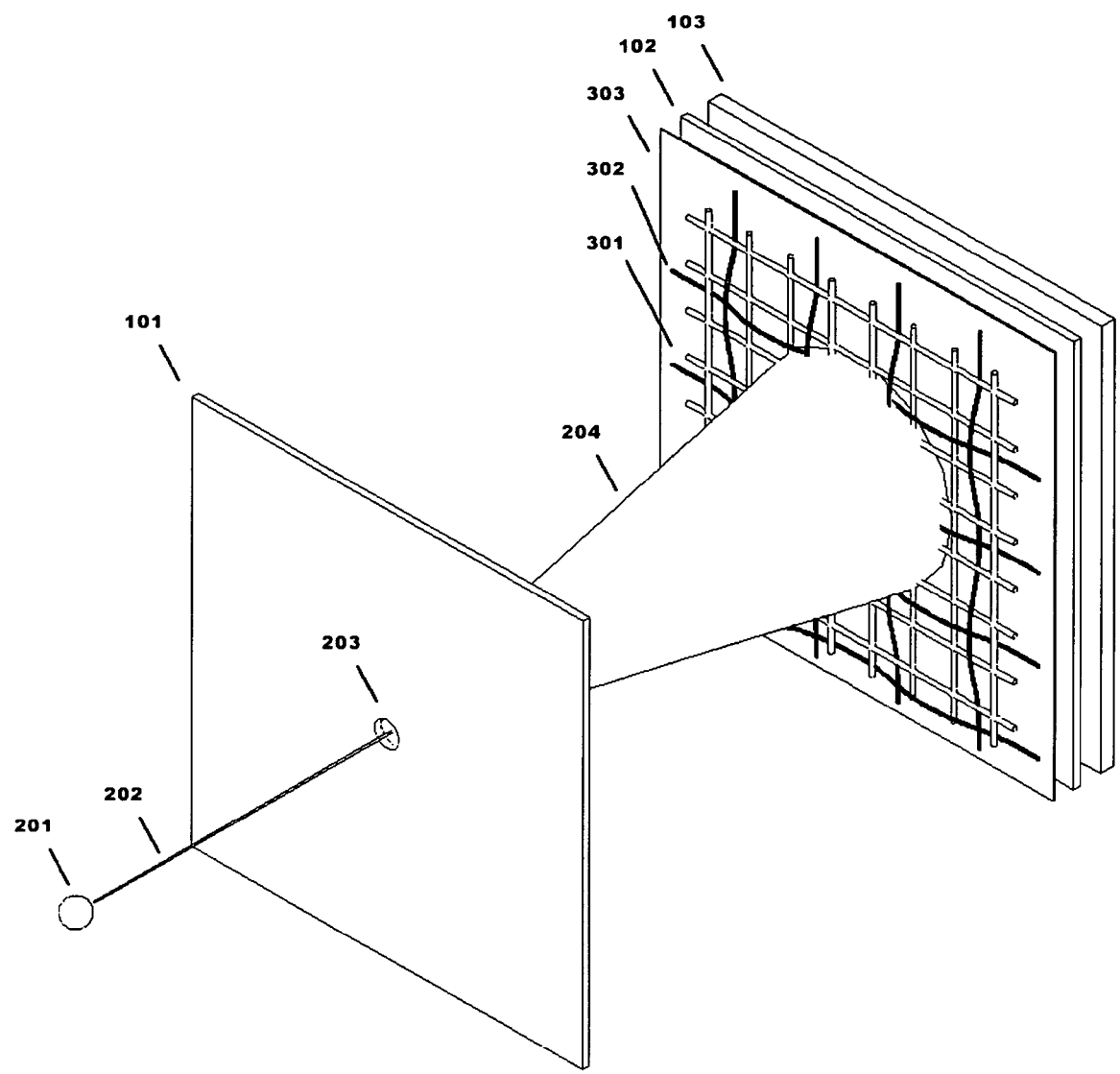
FIG. 4 shows a schematic of a hypervelocity impact on the fiber optic sensor and carrier material.
Figure 5:
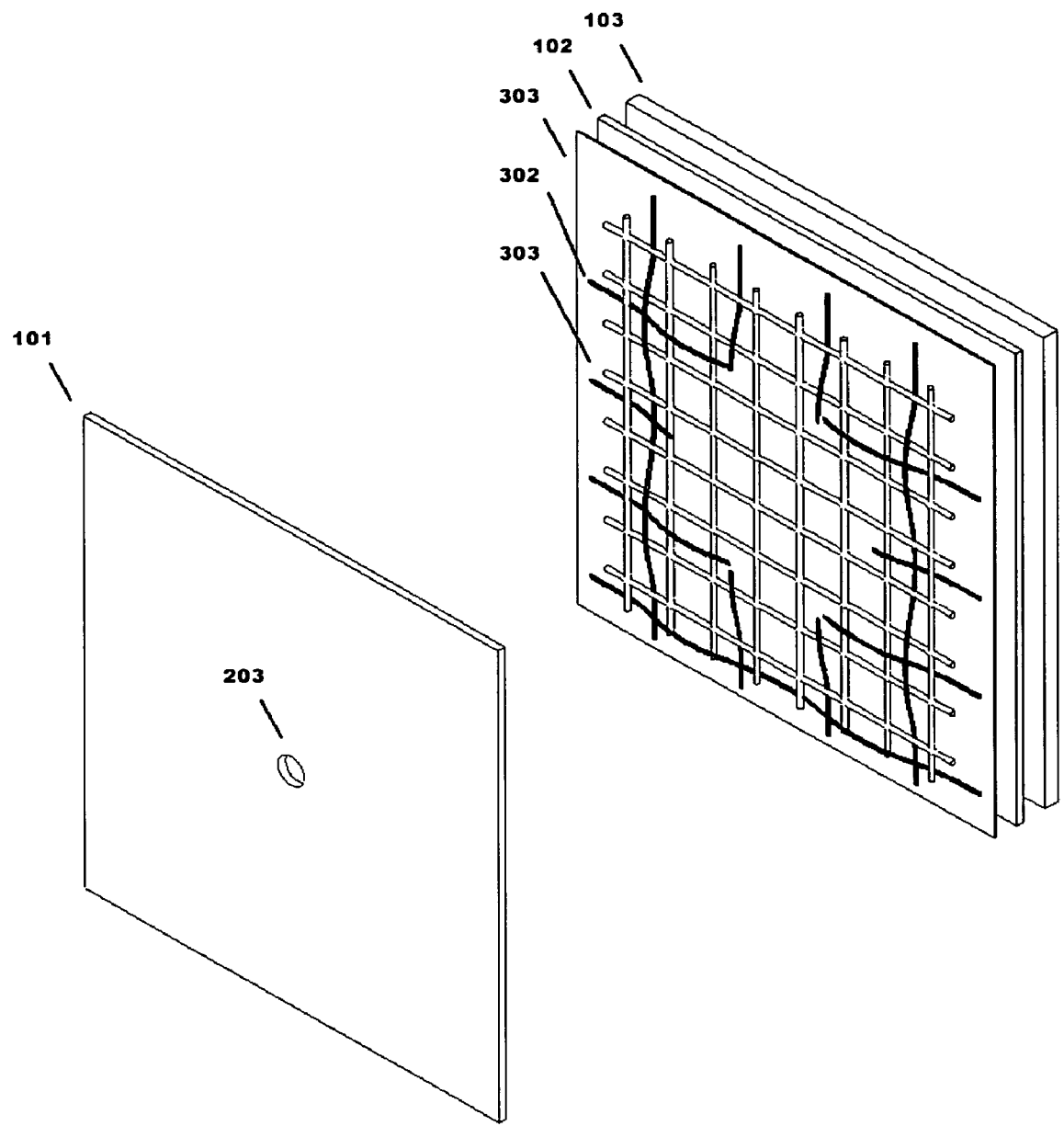
FIG. 5 shows a typical fiber breakage that would be the result of a hypervelocity impact on the fiber optic sensor.

Referring to FIG. 4, with the fiber optic impact sensor in place, the debris plume 204 now strikes the sensor fibers 302 and the mesh 301 before being intercepted by the energy absorbing layer 102. Referring to FIG. 5, after the debris plume 204 strikes the optical fibers 302, some fibers are broken, and others are damaged such that the optical attenuation in a local region of the fiber 302 is increased. The broken and damaged fibers define an impact area that is proportional to the cross-sectional area of the debris plume 204 at the plane of the carrier 303.

Figure 6:
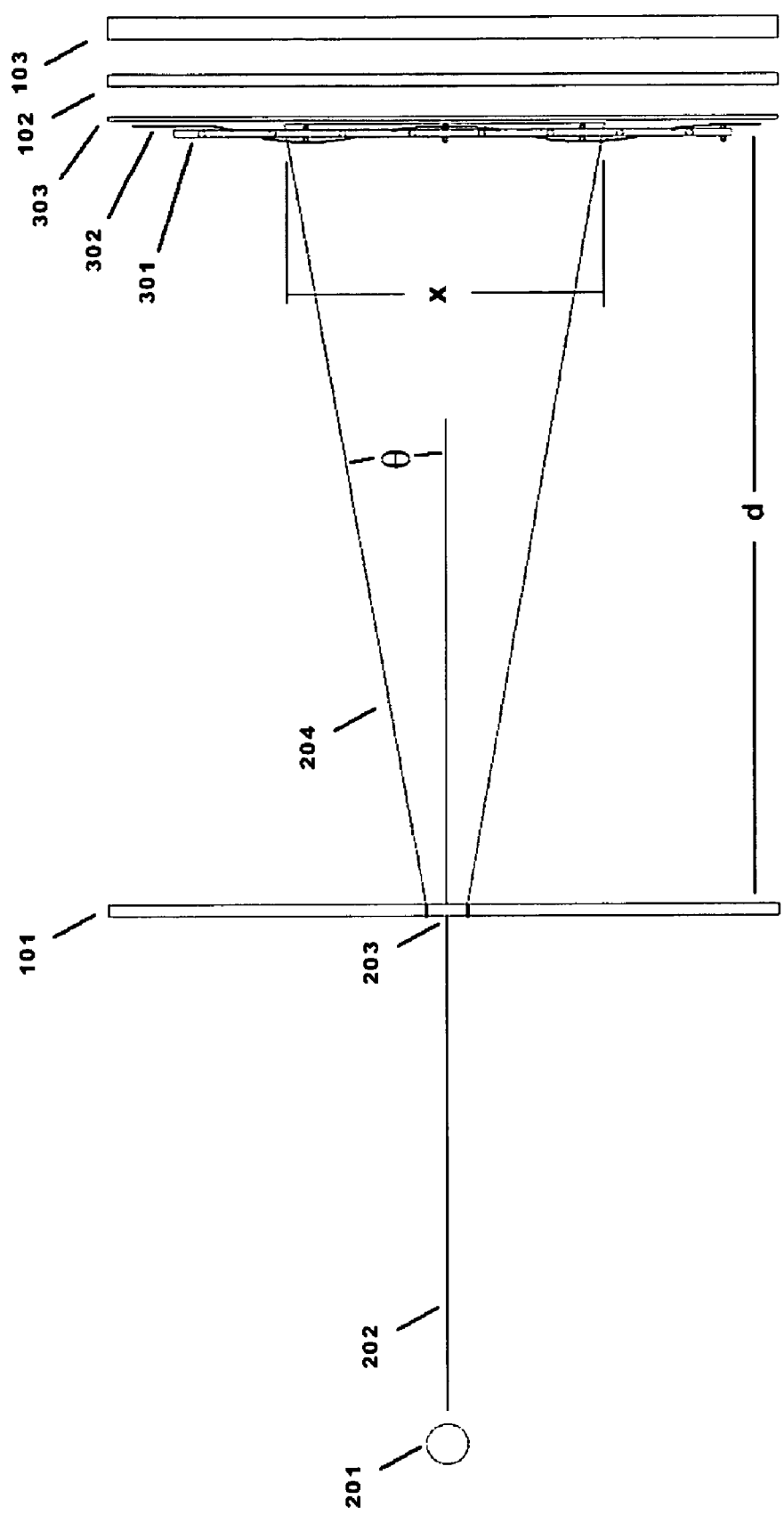
FIG. 6 shows the geometry of a hypervelocity impact debris plume including the cone angle and the bumper shield stand off distance.
Figure 7:
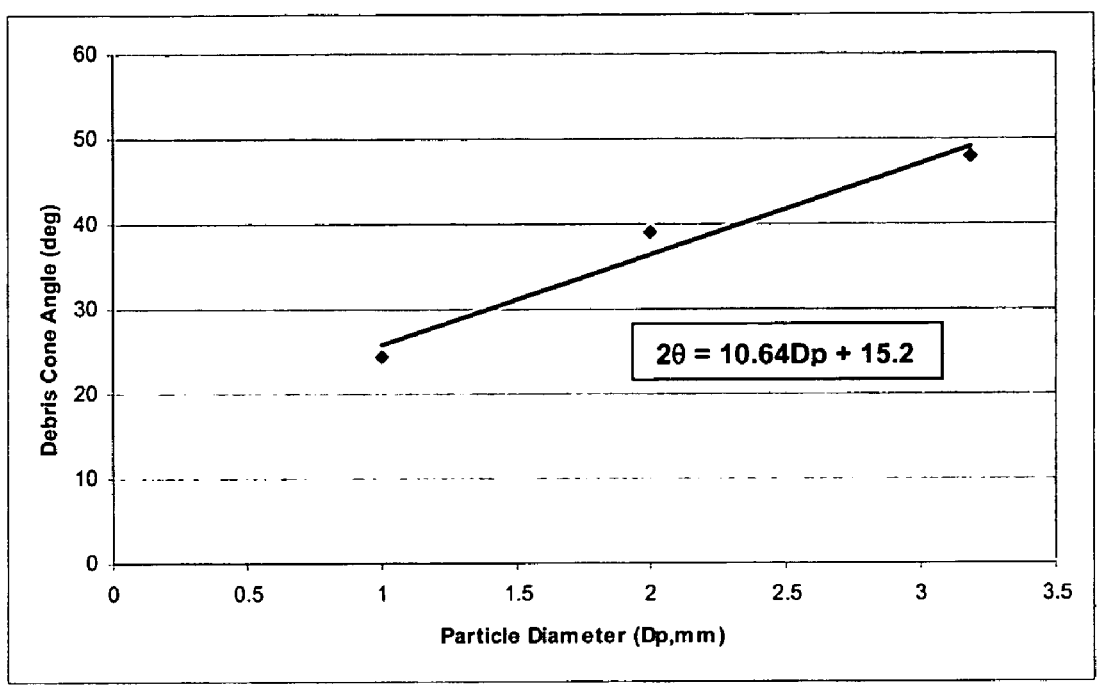
FIG. 7 shows a graph of the debris cone angle versus hypervelocity impact particle diameter.

Referring to FIG. 6, the side view of the structure 101–103 and the fiber optic sensor 301–303 shows that the debris plume 204 is approximated by a truncated cone with half-angle θ, height d and base diameter X. It is known (for example, see Lamontagne, Chantal G., "Hypervelocity impact damage to polymer matrix composite structures in space", University of Toronto, Institute for Aerospace Studies, 2003) that the cone angle θ is related to the impacting MOD particle 201 diameter $D_p$ by the linear relationship shown in FIG. 7 and described by the equation $$2\theta = 10.64\ D_p + 15.2 (deg) \quad (1)$$

For an impact that is perpendicular to the bumper shield 101, the fiber optic impact sensor 301–303 reports broken or damaged fibers over an approximately circular area A with diameter equal to the base diameter X of the debris plume 204. The impacting MOD particle 201 diameter $D_p$ is then calculated from the equation $$D_p = \frac{1}{10.64}\left[2\tan^{-1}\left(\frac{X}{2d}\right) - 15.2\right](mm) \quad (2)$$

Figure 8:
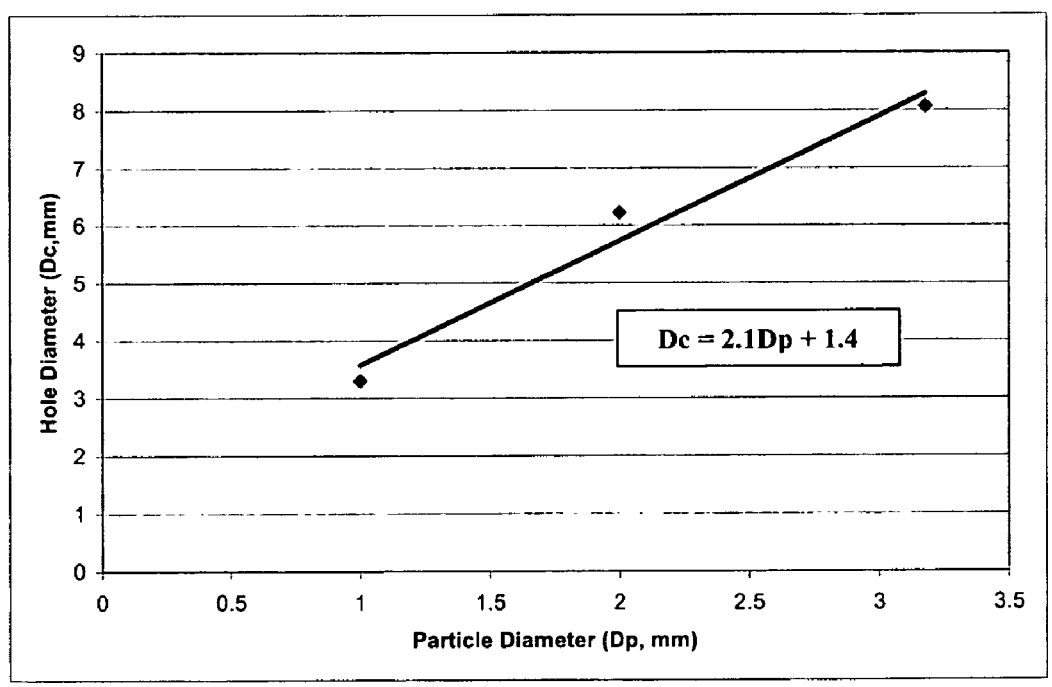
FIG. 8 shows a graph of the entry hole diameter versus hypervelocity impact particle diameter for metallic structures.

It is known that the impacting MOD particle 201 diameter $D_p$ is related to the entry hole 203 diameter $D_c$ in metallic bumper shields 101 by the relationship depicted in FIG. 8 and by the equation $$D_c = 2.1\ D_p + 1.4(mm) \quad (3)$$

Figure 9:
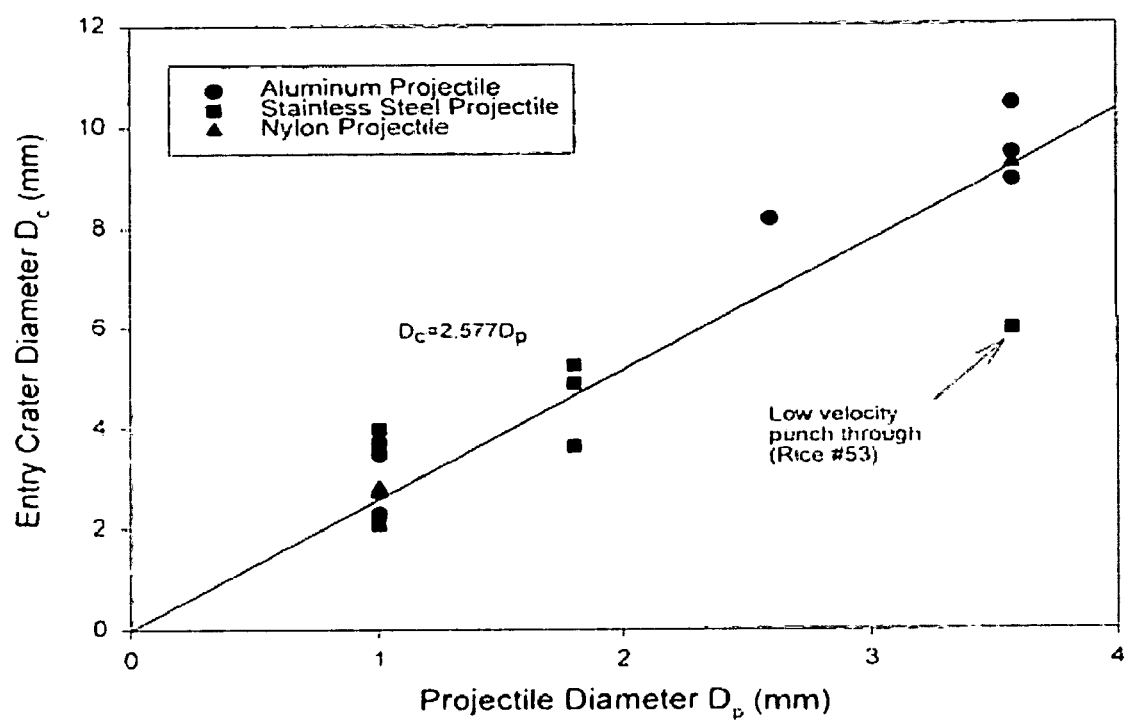
FIG. 9 shows a graph of the entry hole diameter versus hypervelocity impact particle diameter for composite structures.

It is also known that the impacting MOD particle 201 diameter $D_p$ is related to the entry hole 203 diameter $D_c$ in composite material bumper shields 101 by the relationship depicted in FIG. 9 and by the equation $$D_c = 2.577\, D_p \text{(mm)} \tag{4}$$

It is evident from Equations 1–4 that the fiber optic sensor can be used to determine the diameter $D_c$ of the entry hole 203 once the damaged area of the sensor is reported. Similar analysis applies to oblique impacts to allow determination of the origin of non-perpendicular impacts.

Figure 10:
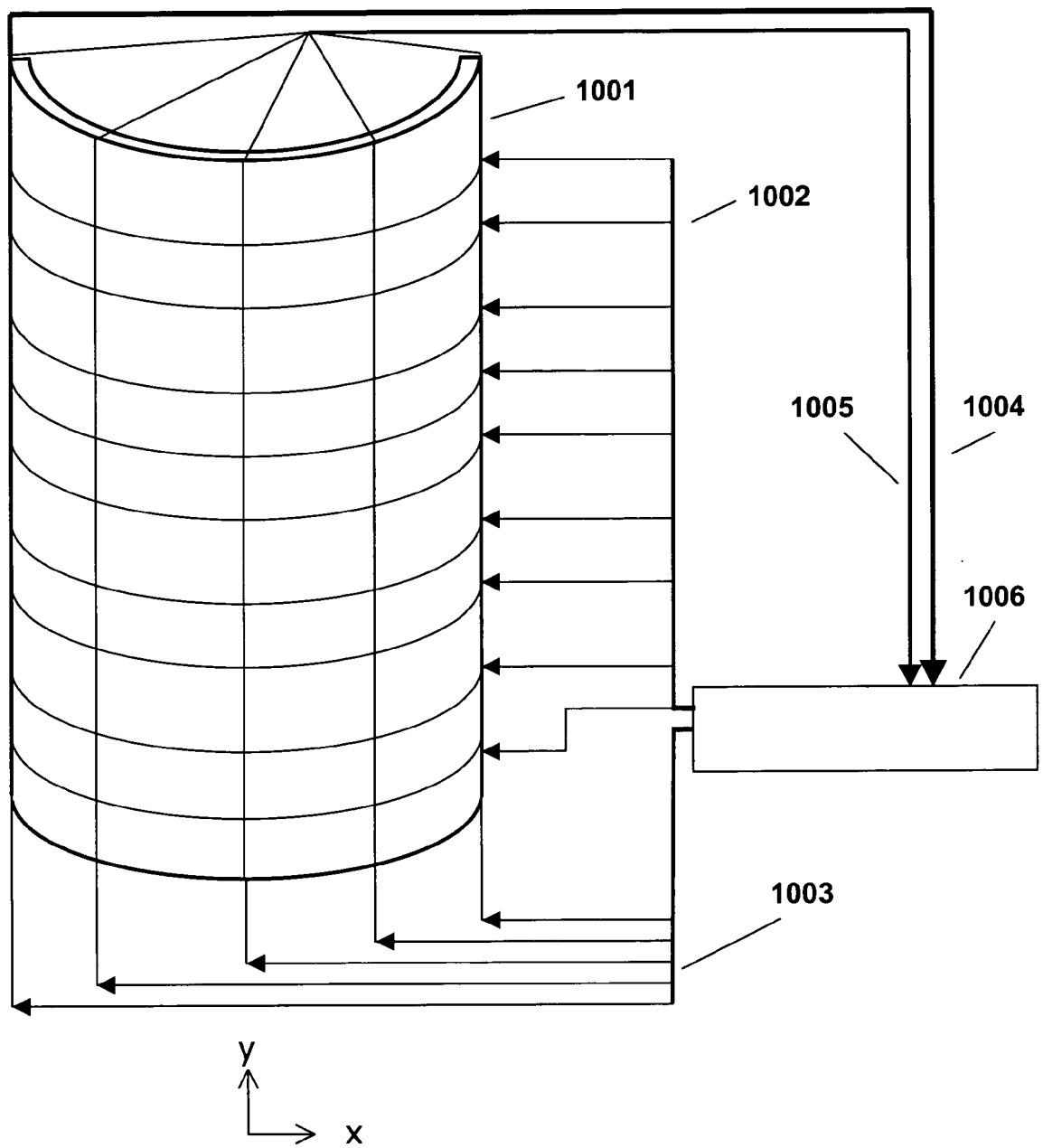
FIG. 10 shows a schematic of one section of one embodiment of the optical sensor and system for a large structure.

FIG. 10 shows a schematic of one section of one embodiment of the optical sensor and system for a large structure. In the preferred embodiment, the orthogonal grid is spaced to enable detection of the impact of the smallest critical MOD particle. The sensor instrumentation 1006 contains a multitude of light sources that transmit light through multi-fiber ribbon cables 1002–1003 to the structure 1001, where the individual fibers are fanned out to form the x- or y-axis portions of the fiber optic sensor. The optical fibers that emerge from the sensor at the side opposite the light input are fanned into ribbon cables 1004–1005 so that the light signal can be returned to the detection circuit within the sensor instrumentation 1006. The sensor instrumentation 1006 maps each sensor fiber to a specific location on the structure such that the crossing of two fibers denotes a unique location $(x_i, y_i)$. The hardware and software within the sensor instrumentation 1006 utilize the fiber map to locate the impact area, determine its center and area, then use Equations 1–4 to determine the size of the entry hole 203 of FIG. 6.

Figure 11:
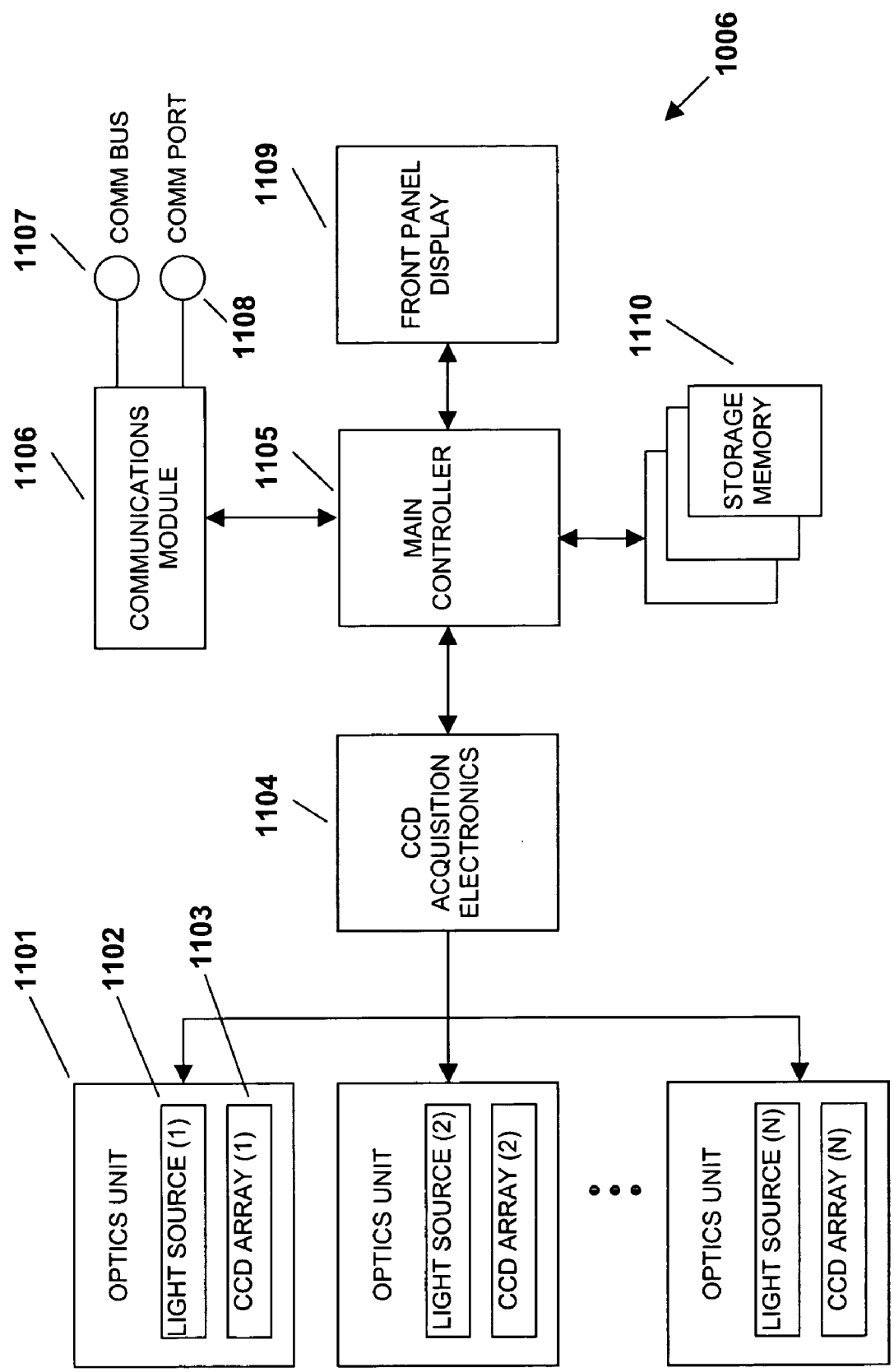
FIG. 11 shows a block diagram of the optoelectronic system for use with the fiber optic sensor.

Referring to FIG. 11, the functionality of the sensor instrumentation 1006 of FIG. 10 is delineated as follows. There are a multitude of optics units 1101 that contain a suitable light source 1102 with the proper optics to couple light into ribbon cables that connect to the sensor fibers on the structure. A mechanical system is used to accurately position a number of fibers to allow for the maximum amount of light in each fiber and to also guarantee a uniform distribution of light throughout the cable. Each optics unit 1102 also contains a commercially available CCD array 1103. The number of CCD arrays 1103 depends upon the number of sensor fibers required for the structure. Within each optics unit 1102, each fiber is mechanically located over a predetermined location over the CCD array 1103 so that each fiber illuminates a certain number of pixels. That ensures that, with adequate manufacturing tolerances, there will be a minimal amount of light-bleed from one fiber to the next one. In one embodiment, each fiber is located over a 5×5 block of pixels, which would be part of a larger 1000×1000 CCD array 1103. A determination of whether or not a sensor fiber is damaged, by the impact of the debris plume, is made from the amount of light detected up by the CCD array 1103. In addition to determining which fiber was broken by the impact, light intensity measurements can also determine the amount of damage to other sensor fibers. That feature improves the accuracy of the impact damage measurement.

Still referring to FIG. 11, the CCD acquisition electronics 1104 is a sub-system whose main function is to interrogate each CCD array 1102 to obtain information on each individual pixel. The pixel information is stored in an array where each location contains a value that reflects the amount of light striking that given pixel. Analysis of that information determines if the associated sensor fiber has been broken or damaged by the impact. The CCD acquisition electronics 1104 also controls the light source 1102. That feature creates the ability to take two readings; one with the light source turned off and one with the source on. That ensures that any noise (dark currents) generated by the individual CCD arrays 1102, due to aging or radiation exposure, will be differentially removed to give the best possible readings.

Still referring to FIG. 11, the main controller 1105 has the main task of orchestrating all the different sub-systems. Primarily, the main controller 1105 takes the data generated by the CCD acquisition electronics 1104 and decides, from the individual data sets, if there is any damage to any sensor fiber and determines if there has been an impact and the exact location, size of the impact and information on the size of the impacting particles. The data is stored in local memory 1110 so that a long-term picture of each sensor fiber can be used to eliminate spurious anomalies and to minimize the possible number of false alarms. Different techniques are used to maintain memory integrity throughout the instrument's life span. The processed data are then transferred to the communication module 1106 where it is sent through a communication bus 1107 and a communication port 1108 that is used to report on the status of the fibers to a centralized server. A version of the processed data is also sent to a visual display 1109. The display 1109 is part of the user interface sub-system. That is where a user sets up such details as the frequency of scans and the number of averaging scans. The display 1109 provides visual feedback of the integrity of the fibers and reports if and where an impact was detected. Both visual and audible alarms are used to alert the user of such an event. The main controller 1105 also includes a scheduler, which starts the process of getting a new snapshot of the CCD arrays 1102 at predetermined intervals. In between scans, the main controller 1105 powers down any non-essential electronics to save on power.

Figure 12:
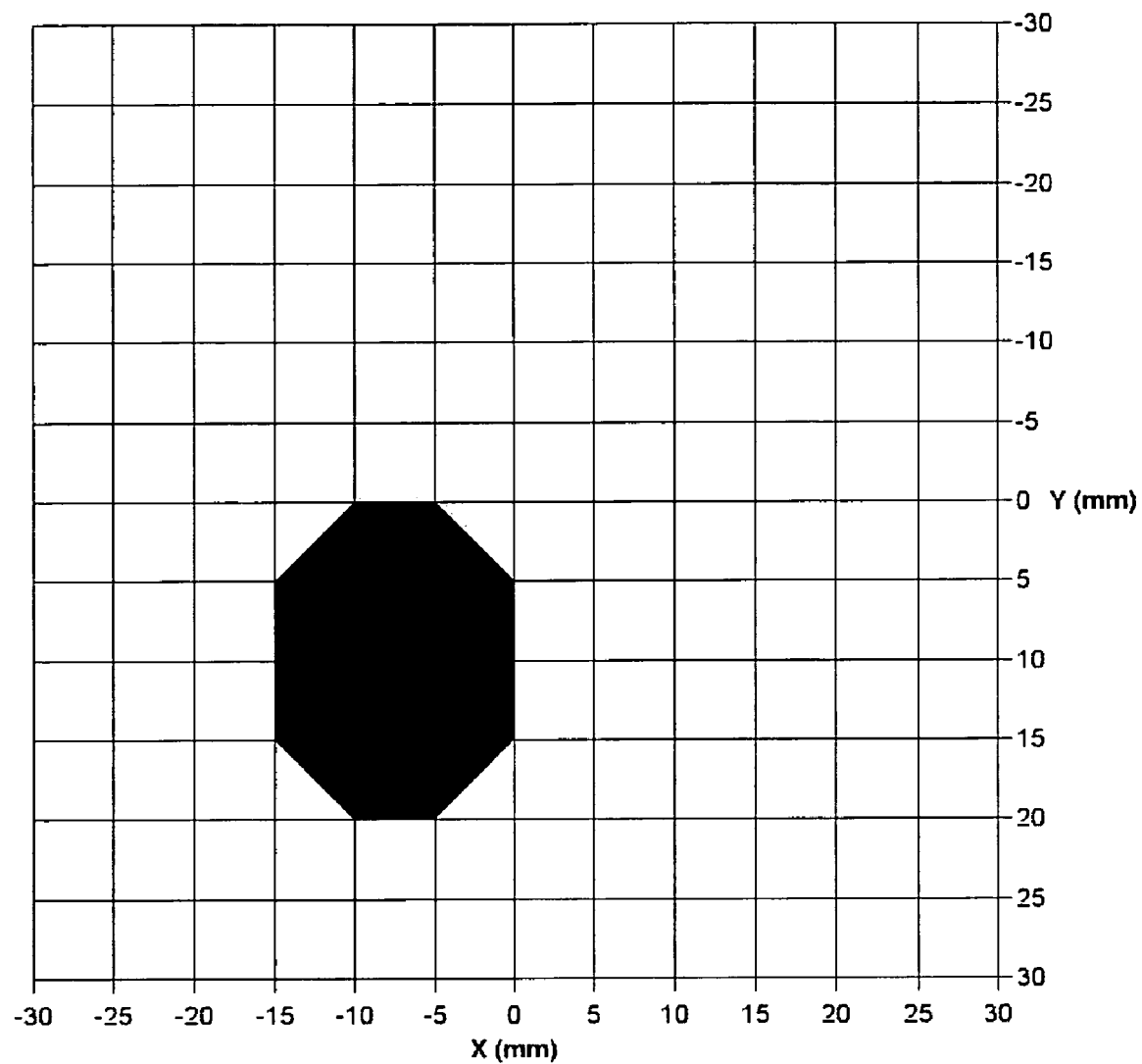
FIG. 12 shows a graph of the maximum sensor area affected by the debris plume.

Referring to FIG. 12, a simple example of a graphical output for the system is shown. That display indicates the location and area of damage reported by the fiber optic sensor, using one embodiment, with sensor fiber spacing in both the x- and y-directions of 5 mm. FIG. 12 indicates that the sensor system reports that x-direction sensor fibers at −5 and −10 mm are damaged or broken and that y-direction sensor fibers at 5, 10, and 15 mm are also damaged or broken. The center of the damaged area is at $(x_i, y_i) = (-7.5, 10)$ mm. A value of zero is assigned to a fiber that is damaged or broken and a value of one (1) is assigned to all other fibers. To conservatively determine the damaged area, the x- and y-direction values are summed at each $(x_i, y_i)$ location, and if the result is zero, the area within ±5 mm in both directions is deemed to be damaged. The total damaged area A in the present example is 250 mm². From Equations 1–4, for a stand off distance d=50 mm, the diameter of the impacting particle $D_p$=0.47 mm and the diameter of the entry hole $D_c$=2.4 mm. The fiber spacing in the sensor grid determines how accurately the sensor determines the size of the entry hole.

While the above invention has been shown and described in relation to particular arrangements of optical fibers, and in relation to particular geometries, materials and electronic circuitry, it will be understood by those skilled in the art that various changes or modifications could be made without varying from the scope of the present invention. Therefore the present invention should be construed as limited only by the appended claims.

We claim:

1. A fiber optic impact detection system for sensing damage to structures due to impact of debris plumes from high energy objects and MOD particles, said system comprising:
 a carrier mesh structure;
 a plurality of optical fibers woven into a grid pattern through the carrier mesh structure, each of the plurality of optical fibers having a first end and a second end, the grid pattern defining an x-direction and a y-direction, the plurality of optical fibers comprising a first set of optical fibers extending in the x-direction and a second set of optical fibers extending in the y-direction;
 a first multi-fiber optical fiber cable that is fanned out to join to the first end of each of the first set optical fibers;
 a second multi-fiber optical fiber cable that is fanned out to join to the first end of each of the second set of optical fibers;
 a third multi-fiber optical fiber cable that is fanned out to join to the second end of each of the first set of said optical fibers;
 a fourth multi-fiber optical fiber cable that is fanned out to join to the second end of each of the second set of said optical fibers;
 a sensor instrument comprising a plurality of light sources that are connected to said first and second multi-fiber optical cables to supply light to said optical fibers in said grid, said instrument also comprising a plurality of optical detectors that are connected to said third and fourth multi-fiber cables to detect light coming through said optical fibers in the grid, said instrument sensing any change in light passing through said fibers, locating the change, and measuring an extent of damage indicated by the change in light; and
 a carrier material to which said mesh is attached, said carrier material being capable of being attached to or embedded in a structure to be monitored where said debris plume, produced by a perpendicular incidence impacting object, is detected, located and measured by said sensor instrument by sensing a change in said light conducted by said multitude of optical fibers in said carrier mesh over an approximately rectangular area and converting said rectangular area into an equivalent circular or elliptical area, and converting said circular or elliptical area into a diameter of said impacting object and a diameter of the entry hole for impacts on metal and composite materials.

2. The fiber optic impact detection system recited in claim 1, wherein said multitude of optical fibers is comprised of single-mode or multi-mode telecommunication grade fibers.

3. The fiber optic impact detection system recited in claim 1, wherein said carrier mesh is comprised of an open weave or fabric that allows said multitude of optical fibers to be woven in at a spacing such that the light being conducted through the plurality of fibers in said grid pattern is affected by said debris plumes.

4. The fiber optic impact detection system recited in claim 1, wherein a plurality of said carrier meshes and optical fiber grids are multiplexed together in communication with the same said sensor instrument.

5. The fiber optic impact detection system recited in claim 1, wherein said multitude of light detectors are CCDs (charge coupled devices) in which said multitude of optical fibers in said multi-fiber cables are mechanically positioned over a plurality of pixels in said CCDs.

6. The fiber optic impact detection system recited in claim 1, wherein said carrier material is flexible.

7. The fiber optic impact detection system recited in claim 1, wherein the instrument senses the change in the light at user-selectable scanning rates and modes.

8. The fiber optic impact detection system recited in claim 1, wherein the instrument also performs one of storing a detection result, displaying the detection result and triggering alarms to warn of the damage.

9. A method for sensing damage to structures due to impact of debris plumes from high energy objects and MOD particles, said method comprising:
 (a) providing a fiber optic detection system comprising:
 a carrier mesh structure;
 a plurality of optical fibers woven into a grid pattern through the carrier mesh structure, each of the plurality of optical fibers having a first end and a second end, the grid pattern defining an x-direction and a y-direction, the plurality of optical fibers comprising a first set of optical fibers extending in the x-direction and a second set of optical fibers extending in the y-direction;
 a first multi-fiber optical fiber cable that is fanned out to join to the first end of each of the first set optical fibers;
 a second multi-fiber optical fiber cable that is fanned out to join to the first end of each of the second set of optical fibers;
 a third multi-fiber optical fiber cable that is fanned out to join to the second end of each of the first set of said optical fibers;
 a fourth multi-fiber optical fiber cable that is fanned out to join to the second end of each of the second set of said optical fibers;
 a sensor instrument comprising a plurality of light sources that are connected to said first and second multi-fiber optical cables to supply light to said optical fibers in said grid, said instrument also comprising a plurality of optical detectors that are connected to said third and fourth multi-fiber cables to detect light coming through said optical fibers in the grid, said instrument sensing any change in light passing through said fibers, locating the change, and measuring an extent of damage indicated by the change in light; and
 a carrier material to which said mesh is attached, said carrier material being capable of being attached to or embedded in a structure to be monitored;
 (b) attaching said mesh to, or embedding said mesh in, the structure to be monitored; and
 (c) using said instrument to measure the extent of the damage wherein, when said debris plume is produced by perpendicular incidence impacting object, step (c) comprises detecting, locating, and measuring said debris plume by sensing a change in said light conducted by said multitude of optical fibers in said carrier mesh over an approximately rectangular area and converting said rectangular area into an equivalent circular or elliptical area, and converting said circular and elliptical area into the a diameter of said impacting object and a diameter of the entry hole for impacts on metal and composite materials.

10. The method recited in claim 9, wherein said multitude of optical fibers is comprised of single-mode or multi-mode telecommunication grade fibers.

11. The method recited in claim 9, wherein said carrier mesh is comprised of an open weave or fabric that allows said multitude of optical fibers to be woven in at a spacing such that the light being conducted through the plurality of fibers in said grid pattern is affected by said debris plumes.

12. The method recited in claim 9, wherein a plurality of said carrier meshes and optical fiber grids are multiplexed together in communication with the same said sensor instrument.

13. The method recited in claim 9, wherein said multitude of light detectors are CCDs (charge coupled devices) in which said multitude of optical fibers in said multi-fiber cables are mechanically positioned over a plurality of pixels in said CCDs.

14. The method recited in claim 9, wherein said carrier material is flexible.

15. The method recited in claim 9, wherein step (c) is performed at user-selectable scanning rates and modes.

16. The method recited in claim 9, further comprising one of storing a detection result, displaying the detection result and triggering alarms to warn of the damage.

17. The method of claim 9, wherein step (b) comprises retrofitting the structure to be monitored with the carrier mesh.

18. The method of claim 17, wherein the structure to be monitored is a spacecraft.

19. The method of claim 9, wherein the structure to be monitored is a spacecraft.

* * * * *